March 31, 1964 R. S. PATCH ET AL 3,127,061
DISCHARGE GATE MECHANISM FOR DISPENSING FREEZERS
Filed Jan. 8, 1962
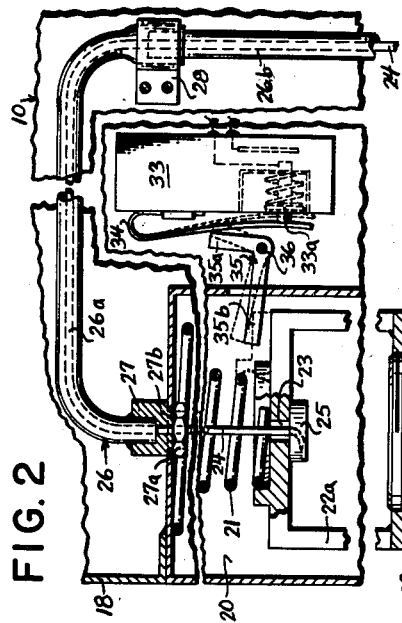
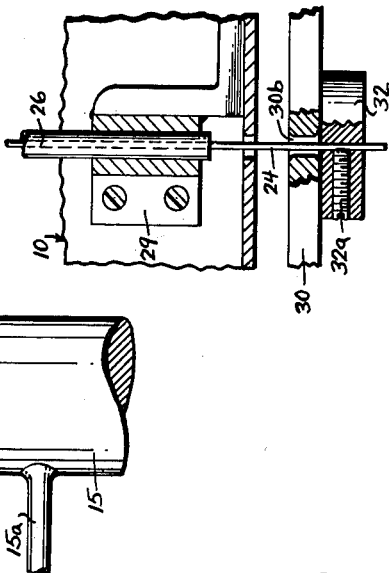
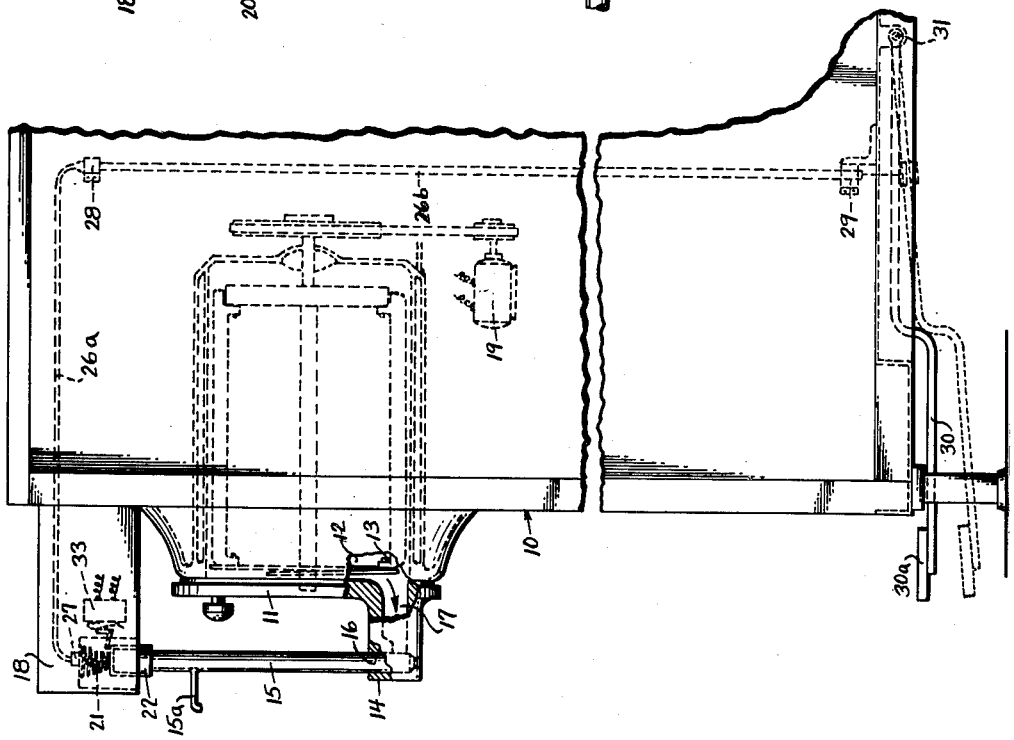
INVENTOR.
ROBERT S. PATCH
HARVEY F. SWENSON
BY Barnes & Seed
ATTORNEYS

United States Patent Office 3,127,061
Patented Mar. 31, 1964

3,127,061
DISCHARGE GATE MECHANISM FOR
DISPENSING FREEZERS
Robert S. Patch, Bainbridge Island, and Harvey F. Swenson, Seattle, Wash., assignors to Sweden Freezer Manufacturing Co., Seattle, Wash., a corporation of Washington
Filed Jan. 8, 1962, Ser. No. 164,791
5 Claims. (Cl. 222—74)

The present invention relates to mechanically operated discharge gates for dispensing freezers and more particularly to a self-closing gate which is cable operated. This application is a continuation-in-part of our copending application, Serial Number 66,582, filed November 1, 1960.

The invention aims to provide an unusually simple, economical and reliable discharge gate mechanism which can be either treadle actuated or manually opened independently of the treadle, and can be easily disassembled for cleaning.

A further object is to provide a simple arrangement for activating the dasher motor responsive to each opening of the discharge gate.

The foregoing and other objects and advantages in view will appear and be understood in the following description and claims, the invention consisting in the novel construction and in the adaptation and combination of parts hereinafter described and claimed.

In the accompanying drawings:

FIGURE 1 is a side elevational view of a dispensing freezer provided with the present invention.

FIG. 2 is a fragmentary vertical sectional view to an enlarged scale of the upper end of the discharge gate and related mechanism; and FIG. 3 is a detail elevational view showing the connection between the cable and treadle.

Referring to the drawings, numeral 10 designates the cabinet of a dispensing freezer for ice cream, slush ice, or other frozen product, having a removable cover 11 for its freezing cylinder 12. A motor-driven dasher 13 operates in the cylinder 12 during freezing of the product and has an auger portion at the front for urging the frozen product toward a discharge gate taking the form of a spigot 14 projecting from the front of the cover 11 and controlled by a plunger or slide valve 15. This spigot 14 is formed with a vertical bore 16 for the slide valve and intersects a discharge passage 17 leading from the freezing cylinder 12 through the cover 11. The lower ends of the bore 16 and slide valve 15 may be correspondingly reduced and necked to insure a clean cut-off of frozen product at the close of each dispensing operation.

Projecting from the freezer cabinet 10 above the spigot 14 is a housing 18 which presents a chamber 20 vertically alined with the slide valve 15 and open at the bottom. A return spring 21 is seated against the roof of this chamber and bears against the head of an adapter nut 22 which is threaded onto the upper end of the slide valve and is formed with a rectangular eye-like crown 22a. The latter has a vertical opening 23 at the top for receiving one end of an activating cable 24 having a terminal retainer 25 from which it extends upwardly through the coils of the spring 21 into a conduit 26. Anchored clamps 27—29 hold the conduit stationary relative to the cabinet 10 and cause it to bend rearwardly at the top into the cabinet proper and to then bend downwardly and extend to the base of the cabinet for guiding the cable 24 to a treadle 30. We prefer that the bent upper portion 26a of the conduit between the clamps 27—28 be plastic tubing while the remainder 26b is of metal or some other material more resistant to flexure and stretching. It will be noted that the clamp 27 is anchored by a nut 27a which is threaded onto a clamp neck 27b depending through the roof of the chamber 20.

The treadle 30 is pivoted at 31 for vertical swinging movement at the underside of the cabinet 10 and has a foot pedal 30a exposed at the front of the freezer. In vertical alinement with the lower end of the conduit 26, this treadle has an opening 30b which receives the lower end of the cable 24 therethrough. The cable in turn has a terminal retainer 32 sleeved thereon which bears against the underside of the treadle and is adjustably locked by a set screw 32a.

It will be noted that the slide valve 15 is equipped with a handle 15a so that when desired, the valve can be lifted into product dispensing position in opposition to the return spring 21 independently of the treadle 30 and cable 24. For this reason the eye 22a of the adapter 22 is given an internal vertical length as long as the stroke of the valve 15. Thus, when the valve is lifted by upward manual pressure on the handle 15a, the adapter 22 is free to slide along the portion of the cable which is exposed between the retainer 25 and the clamp 27. The handle 15a is also useful as a grip for manually turning the valve 15 relative to the adapter 22 while the eye of the latter is restrained so that the valve can be readily removed for cleaning. When the valve is lifted by use of the handle 15a rather than by foot pressure applied to the treadle 30, the friction between the cable 24 and the conduit 26 is normally sufficient to hold the treadle in elevated position. Of course, if the treadle drops in such an instance, it is of no moment since the treadle will be returned by action of the return spring in the same manner as if the valve had been initially lifted by the act of depressing the treadle. If desired, the return spring 21 can be supplemented by a spring acting on the treadle 30 as a counterbalance to the weight thereof.

In order to dispense frozen product it is essential that the dasher 13 be in operation so that the product will be urged through the spigot 14. Accordingly, the electrical control circuit for the dasher motor 19 not only energizes the motor while the product is being frozen in the freezing cylinder, but includes a parallel circuit path with microswitch 33 which activates the motor whenever its button 33a is depressed. A leaf spring 34 is mounted on the switch housing to overlie the button 33a and yieldingly oppose movement of one arm 35a of a bell crank actuator 35 toward the switch. This actuator is pivoted at 36 and has its other arm 35b projecting into the chamber 20 above the head of the adapter 22 to be engaged thereby whenever the slide valve 15 is lifted into product discharge position in opposition to the return spring 21. As the valve is so lifted, the actuator 35 is swung clockwise forcing its arm 35a against the leaf spring 34 and causing the latter to bear against the switch button 35a, thereby closing the switch 35 and starting the dasher motor. When the slide valve 15 is released and lowered to gate closing position by action of the return spring 21, the leaf spring 34 is responsively relieved of pressure from the actuator 35 and hence the depressed switch button 33a is again free to move forwardly to switch-open position.

It is thought that the invention will have been clearly understood from the foregoing detailed description. Changes in the details of construction will suggest themselves and may be resorted to without departing from the spirit of the invention, wherefore it is my intention that no limitations be implied and that the hereto annexed claims be given a scope fully commensurate with the broadest interpretation to which the employed language admits.

What we claim is:

1. In combination, a dispensing freezer assembly having a freezing chamber with a discharge gate vertically slidable between a lowered closed position and a raised open position, an adapter detachably connected to the upper end of said gate, a return compression spring seated at its upper end against said freezer assembly and at its lower end against the top of said adapter for yieldingly resisting opening of said gate, a treadle swingably mounted at one of its ends on said freezer assembly adjacent the base thereof, conduit means anchored at upper and lower ends to said freezer assembly adjacent said return spring and treadle, respectively, said conduit means looping upwardly from its said anchored upper end and then depending downwardly to its said anchored lowered end, and a cable connected at an upper end to said adapter and extending through said return spring and conduit means and connected at a lower end to said treadle intermediate the ends of the treadle whereby depression of the treadle tensions said cable and responsively opens said gate.

2. In combination, a dispensing freezer assembly having a freezing chamber with a discharge gate slidable between closed and open positions, said gate having a handle, an adapter detachably connected at one end to said gate and having an open interior having a length as great as the stroke of said gate, a return spring bearing against said adapter for yieldingly resisting opening of said gate, a treadle swingably mounted on said freezer assembly adjacent the base thereof, and cable means operatively interconnecting said treadle and adapter whereby depression of the treadle opens the gate, said cable means extending through said cable opening and having a retainer within said open interior of the adapter whereby said gate can be manually opened independently of said cable means and treadle.

3. In combination, a dispensing freezer assembly having a freezing chamber with a discharge gate slidable between closed and open positions, and having a motor-driven dasher, the dasher motor having an electric control circuit including a normally-open switch arranged to activate the motor when closed, said gate having a handle, an adapter detachably connected at one end to said gate and having an open interior exposed to the other end of the gate by a cable opening, said open interior having a length as great as the stroke of said gate, a return spring bearing against said adapter for yieldingly resisting opening of said gate, actuator means for said switch arranged to be engaged by said gate during movement thereof toward its said open position whereby said dasher motor is energized responsive to opening of said gate, a treadle swingably mounted at one of its ends on said freezer assembly adjacent the base thereof, and cable means operatively interconnecting said treadle intermediate the latter's ends and said adapter whereby depression of the treadle tensions said cable and responsively opens the gate, said cable means extending through said cable opening and having a retainer within said open interior of the adapter whereby said gate can be manually opened independently of said cable means and treadle.

4. In combination, a dispensing freezer assembly having a freezing chamber with a removable cover having a discharge passage therethrough, a discharge gate having an end portion removable from said cover and vertically movable in said cover between a lowered position closing said discharge passage and a raised open position for discharge of frozen product from said freezing chamber, an adapter having the upper end of said gate detachably connected thereto, spring means yieldingly resisting raising of said adapter, a lever swingably mounted on said freezer assembly at a level below said freezing chamber, conduit means anchored at upper and lower ends to said freezer assembly adjacent said adapter and lever, respectively, said conduit means looping upwardly from its said anchored upper end and then depending downwardly to its said anchored lowered end, and a cable connected at an upper end to said adapter and extending through said conduit means to an operative connection with said lever whereby depression of the lever raises said adapter by tensioning said cable and responsively opens said gate.

5. In combination with the structure of claim 4, a motor-driven dasher in said freezing chamber, the dasher motor having an electric control circuit including a normally-open switch arranged to activate said motor when closed, and actuator means for said switch arranged to be engaged by said adapter during movement thereof into gate opening position.

References Cited in the file of this patent
UNITED STATES PATENTS

| | | |
|---|---|---|
| 1,366,072 | Hall | Jan. 18, 1921 |
| 1,611,386 | Stanley | Dec. 21, 1926 |
| 1,981,357 | Haupt | Nov. 20, 1934 |
| 2,099,253 | Bagby | Nov. 16, 1937 |
| 2,103,687 | McKenney | Dec. 28, 1937 |
| 2,740,262 | Stalkup | Apr. 3, 1956 |
| 2,952,140 | Patty | Sept. 13, 1960 |